(12) United States Patent
Jager

(10) Patent No.: US 7,587,993 B2
(45) Date of Patent: Sep. 15, 2009

(54) TOY FOR ANIMALS

(75) Inventor: Claudius Jager, Boulder, CO (US)

(73) Assignee: Artemis Rubber Technology Inc., Longmont, CO (US)

( * ) Notice: Subject to any disclaimer, the term of this patent is extended or adjusted under 35 U.S.C. 154(b) by 0 days.

(21) Appl. No.: 11/759,060

(22) Filed: Jun. 6, 2007

(65) Prior Publication Data

US 2007/0283900 A1    Dec. 13, 2007

Related U.S. Application Data

(63) Continuation-in-part of application No. 11/450,627, filed on Jun. 9, 2006.

(51) Int. Cl.
*A01K 29/00* (2006.01)
*A63H 3/28* (2006.01)

(52) U.S. Cl. ........................ 119/709; 446/184

(58) Field of Classification Search ................ 119/707, 119/709–711, 702; 446/184, 192, 193
See application file for complete search history.

(56) References Cited

U.S. PATENT DOCUMENTS 1,595,441 A * 8/1926 Zenger ........................ 473/571
6,439,950 B1 * 8/2002 Goldman et al. ............. 446/220
6,935,274 B1 * 8/2005 Rothschild .................... 119/702
2005/0035150 A1 * 2/2005 Laverdure ..................... 222/92
2005/0282459 A1 * 12/2005 Chan et al. .................... 446/15

OTHER PUBLICATIONS

Astlett Rubber, Natural Rubber, <http://www.astlettrubber.com/nr/index.html>, as viewed by www.archive.org on Feb. 6, 2005.*

* cited by examiner

*Primary Examiner*—Michael R Mansen
*Assistant Examiner*—Stephen Brookman
(74) *Attorney, Agent, or Firm*—Robert W. Becker; Robert W. Becker & Assoc.

(57) ABSTRACT

A toy for animals, comprising an outer, hollow shell member of elastomeric material. The shell member has at least one hole to provide communication between the hollow interior and the exterior thereof. A hollow, flexible insert is disposed within the shell member and is at least partially in contact therewith. The hollow insert can have a recessed portion or an integral center core. An acoustic cartridge is disposed in a port of the hollow insert.

14 Claims, 12 Drawing Sheets

TOY FOR ANIMALS

CROSS-REFERENCE TO RELATED APPLICATIONS

This application is a continuation-in-part of pending application Ser. No. 11/450,627 filed Jun. 9, 2006.

BACKGROUND OF THE INVENTION

The present invention relates to a toy for animals, especially a squeaker, squeeze toy for dogs.

SUMMARY OF THE INVENTION

The animal toy of the present application comprises an outer hollow shell member of elastomeric material, with the shell member having at least one hole that provides communication between the hollow interior and the exterior of the shell member; a hollow, flexible insert is disposed within the shell member and is at least partially in contact therewith, the insert having a port; and an acoustic cartridge is disposed in the port of the insert.

Further specific features of the present invention will be described in detail subsequently.

BRIEF DESCRIPTION OF THE DRAWINGS

Several embodiments of the animal toy of the present application are illustrated in the drawings, which are presented by way of example only, and in which.

DETAILED DESCRIPTION OF THE INVENTION

Figure 1:
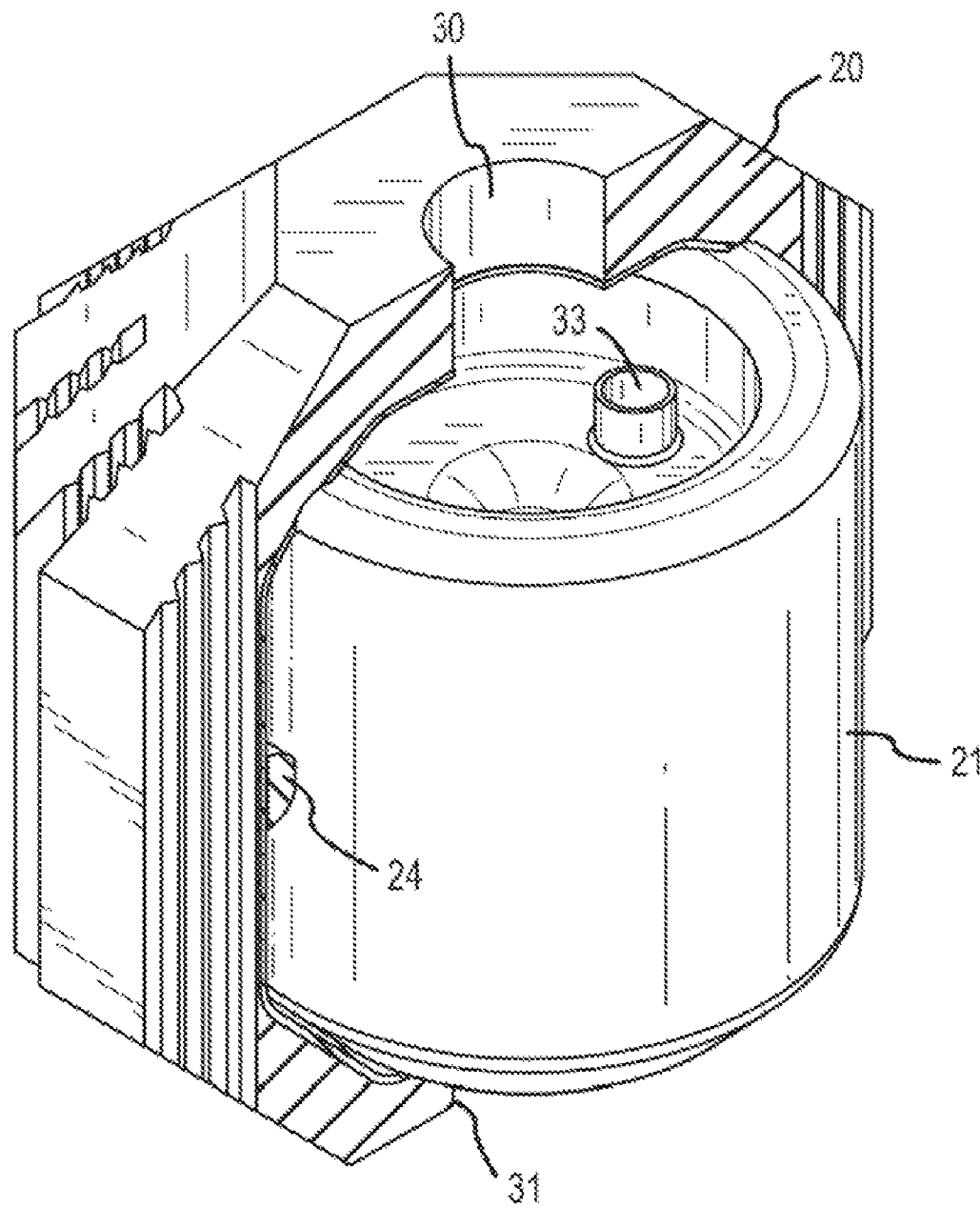
FIG. 1 is a cut-away view of an outer shell member encasing a hollow insert.

Referring now to the drawings in detail, several exemplary embodiments of the inventive toy for animals are illustrated in the accompanying FIGS. 1-14.

FIG. 1 shows two of the components of the toy of the present application. The outer, hollow shell member 20 is partially cut-away to show the hollow insert or bladder 21. In reality) the outer shell member 20 surrounds the insert 21, and in particular in such a way as to be in partial contact therewith, as will be described in detail subsequently. Furthermore, the shapes of the shell member 20 and of the hollow insert 21 can vary, as will also be described in detail subsequently In principle, the shell member 20 and the insert 21 can have any desired shape (see, for example, FIGS. 1-3 and 6-14), as long as the aforementioned partial contact between them exists.

Figure 2:
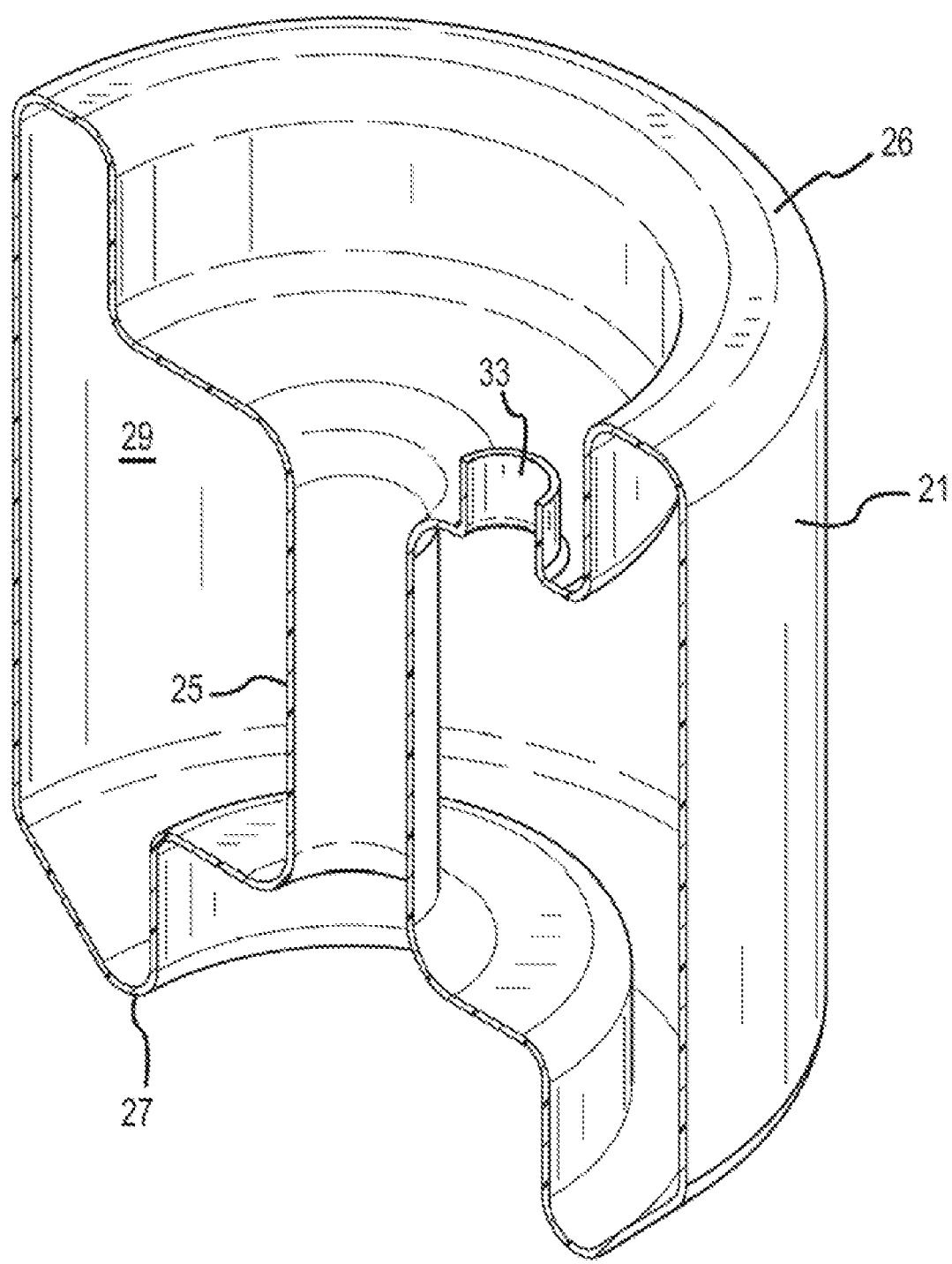
FIG. 2 is a cross-sectional view of one exemplary embodiment of a hollow insert.

In the embodiment of the toy shown in FIGS. 1 and 2, the opposite ends of the hollow insert 21, and in particular peripheral portions thereof are in contact with the inner wall of the shell member 20, and in particular with at least 5% and preferably at least 40%, of the inner wall depending upon the shapes of the insert 21 and the shell member 20, and/or the materials thereof. It should be noted that although the inner contour of the shell member can conform substantially to the hollow insert 21, it is merely necessary for there to be sufficient contact between the shell member 20 and the insert 21 to keep the insert 21 in place so that the insert cannot rotate about a transverse axis and so that even a slight deformation of the elastomeric shell member 20 from the outside, for example caused by the jaws of a dog when it plays with the toy, will result in deformation of the flexible hollow insert 21, and hence will cause the acoustic cartridge 35 that is held by the hollow insert 21 (see for example FIG. 3) to squeak, as will be described in detail subsequently. Optional spacers 24 can also be provided on the inner wall of the shell member 20 to help hold the hollow insert in place.

As can be seen particularly clearly from the cutaway view of the hollow insert 21 in FIG. 2, in this embodiment not only is the insert 21 generally hollow, but it also has a central portion or core 25 that permits fluid communication from one end 26 of the insert 21 to the other end 27 thereof, yet not to the interior 29 of the hollow insert 21. Furthermore, in this embodiment the shell member 20 is provided with diametrically oppositely disposed holes or openings 30 and 31 (not necessarily of the same size). Therefore, with this embodiment, if an animal has its mouth entirely over one end of the shell member 20, for example where the hole 30 is located, the animal can still breathe due to the central core 25 of the hollow insert 21 and the hole 31 at the other end of the shell member 20. However, the shell member need not necessarily have two openings.

Figure 3:
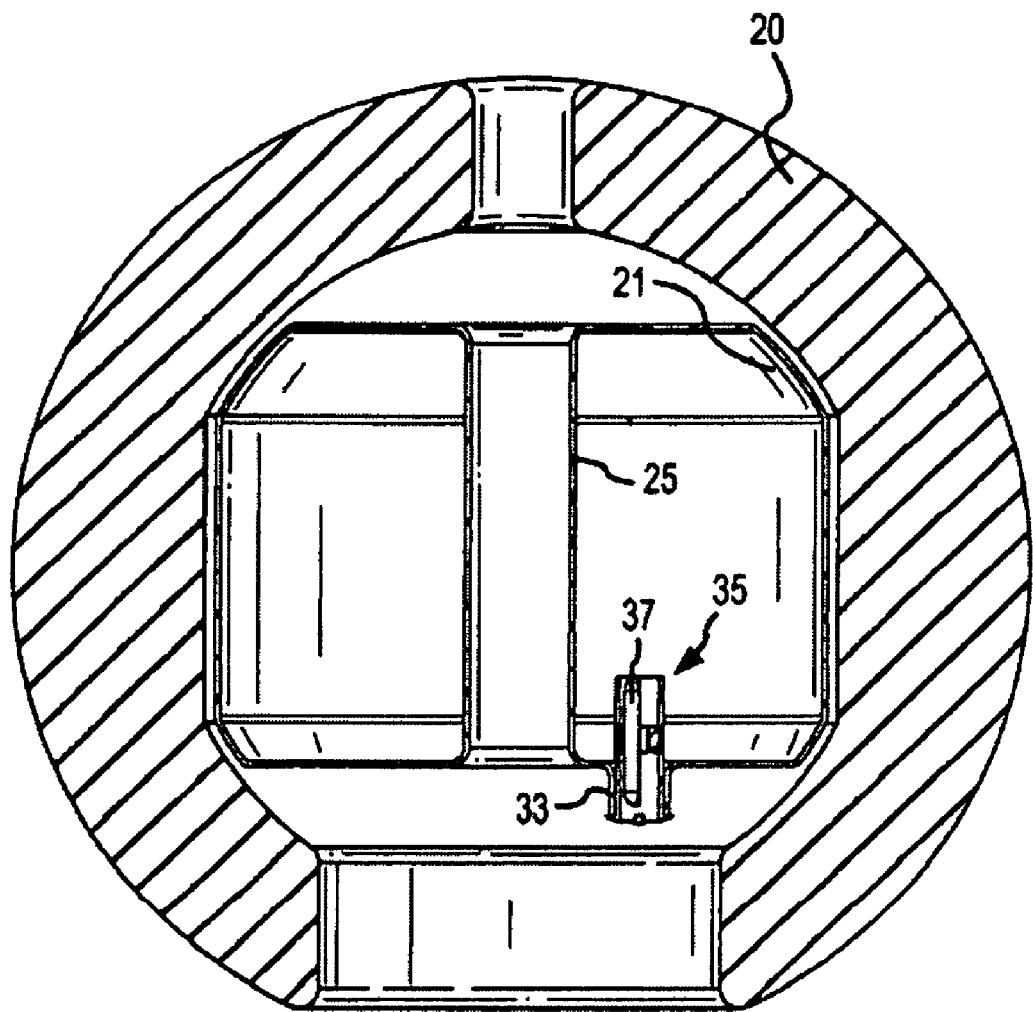
FIG. 3 is a cross-sectional view of one exemplary embodiment of the animal toy of the present application.
Figure 4:
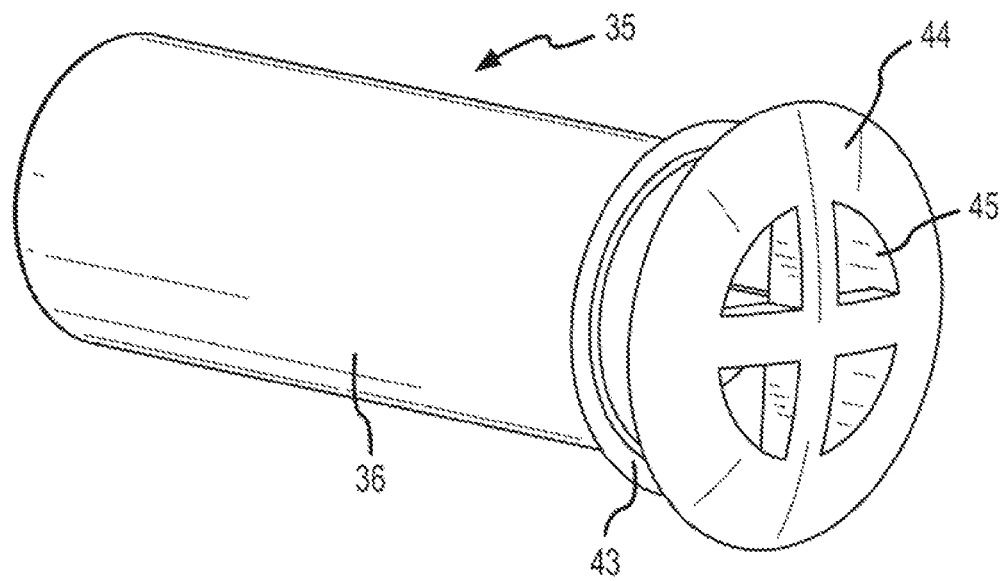
FIG. 4 shows an acoustic cartridge that is to be inserted into the port of the hollow insert.
Figure 5:
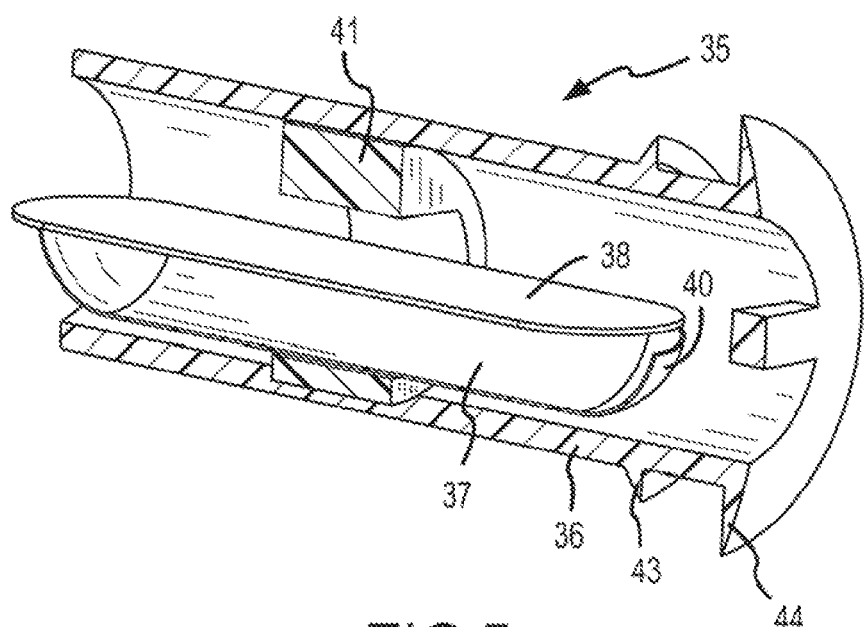
FIG. 5 is a cut-away view of the acoustic cartridge of FIG. 4.

The hollow insert 21 is also provided with a nipple or port 33 (see, for example, FIGS. 1-3) which provides fluid communication to the interior of the insert 21. In FIG. 3, which additionally illustrates a differently shaped embodiment of the outer, hollow shell member 20 and of the hollow insert 21, an acoustic cartridge 35 is disposed and held in the port 33. One exemplary embodiment of an acoustic cartridge 35 in the form of a known squeaker cartridge is here disposed in the port 33. The acoustic cartridge 35 is shown in greater detail in FIGS. 4 and 5. The main body 36 of the acoustic cartridge 35 houses an element 37. To form an acoustic chamber, the element 37 is covered by an acoustic membrane 38. An air inlet 40 into the acoustic chamber of the element is also provided. A yoke 41, which is part of the element 37, helps locate and hold the acoustic chamber member 37, 38 in place in the main body 36 of the acoustic cartridge 35. Means 43 is provided on the outer surface of the main body 36 to help maintain a press fit of the acoustic cartridge 35 in the port 33. The main body 36 is also provided with a flange member 44 to seat the acoustic cartridge 35 on the port 33 and to prevent the acoustic cartridge from being pressed into the interior of the hollow insert 21. Apertures 45 in the flange member 44 allow air to escape from the interior of the hollow insert 21 when an animal squeezes the outer shell member 20, and also allows the acoustic cartridge to function. In particular, when the shell member 20 is deformed, for example by the jaws of a dog playing with the toy, the hollow insert 21 will also be deformed, due to its contact with portions of the shell member 20, and a movement of air, for example as a pulse, will be produced within the acoustic cartridge 35, for example air flow over the acoustic membrane 38, causing the member to vibrate and generate a squeaking noise.

Figure 6:
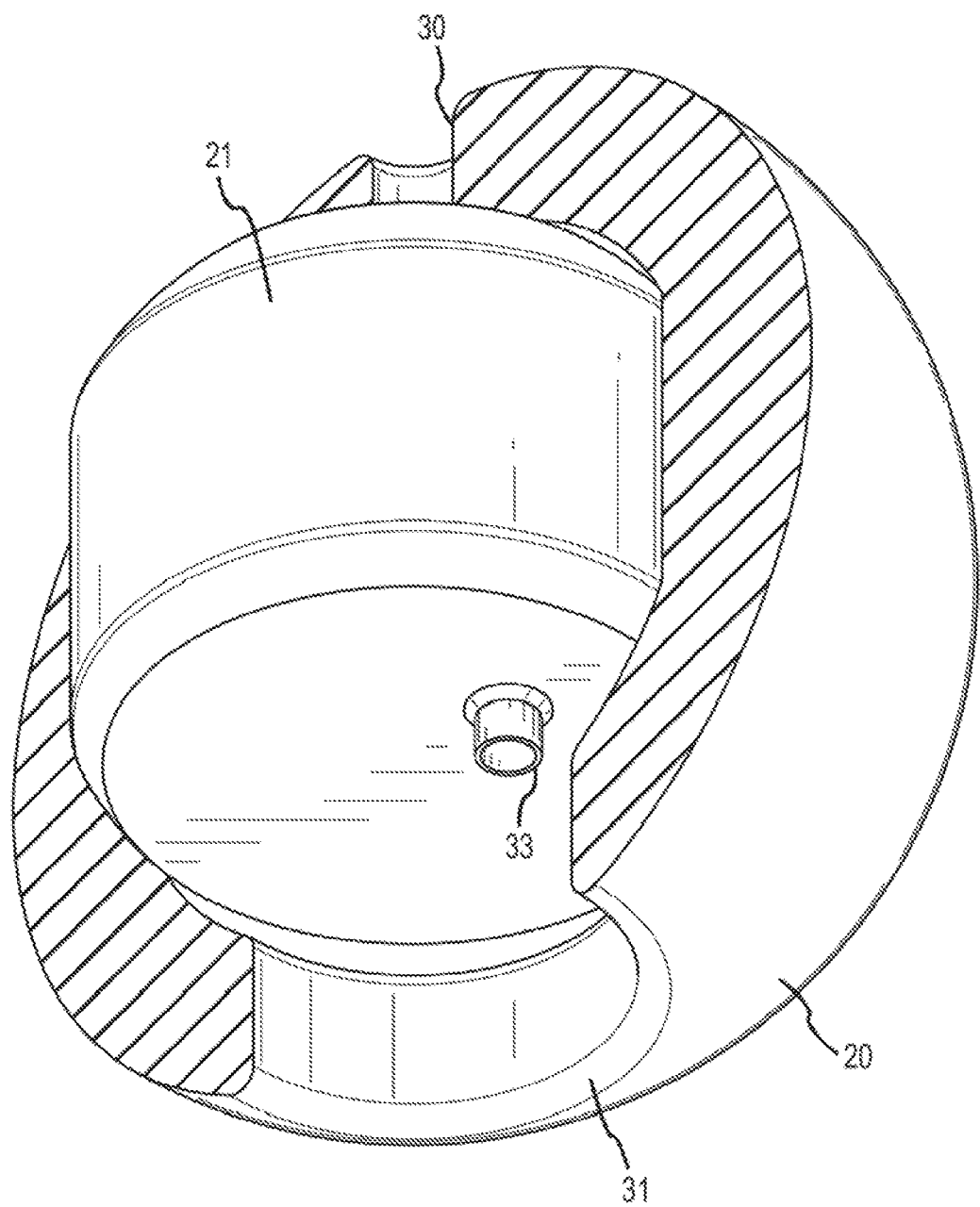
FIG. 6 shows another cut-away view of an exemplary embodiment of the inventive animal toy.

In the embodiments of the toy illustrated in FIGS. 1-3, the hollow insert 21 is provided with a central core 25. However, as shown in FIG. 6, the hollow insert 21 need not necessarily have a central core. In the embodiment of FIG. 6, only the nipple or port 33 is provided. However, in order to provide fluid communication from one end of the insert 21 to the other, it would be possible to provide one or more air grooves on an outer surface of the insert 21 and/or on an inner surface of the shell member 20.

Figure 7:
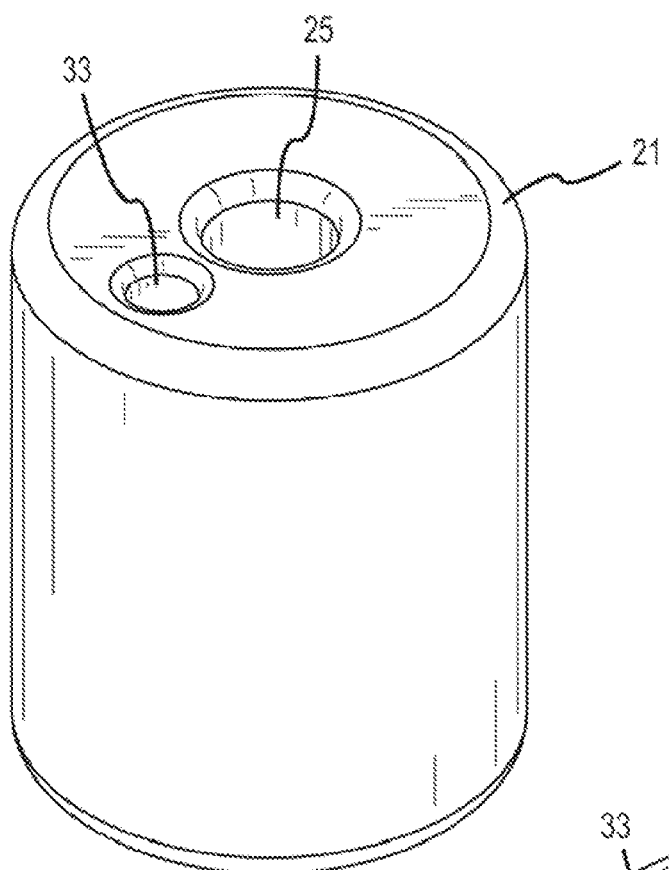
FIG. 7 shows another exemplary embodiment of a hollow insert.
Figure 8:
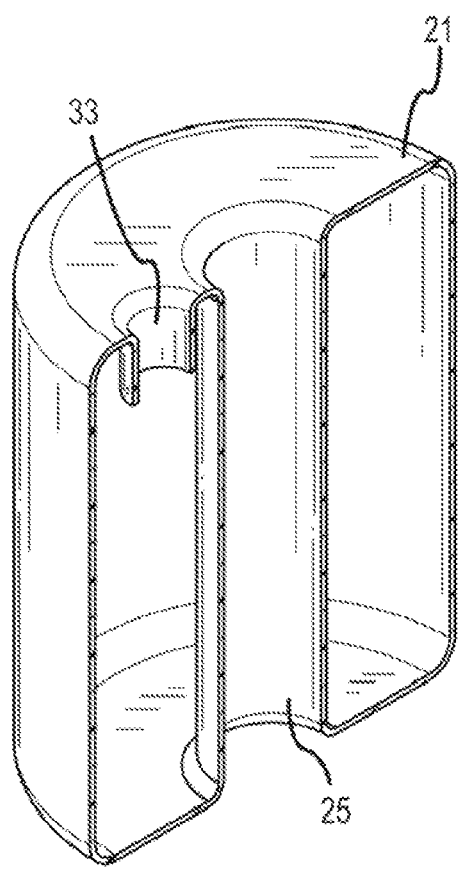
FIG. 8 is a cross-sectional view of the hollow insert of FIG. 7.

In the previously described embodiments, the port 33 projects outwardly from the hollow insert. However, as shown in the embodiment of FIGS. 7 and 8 and in the embodiment of FIG. 10, the nipple or port 33 can also project into the interior of the insert 21, with the exterior thereof being essentially flush with the surface in which it is located. A toy incorporating the hollow insert of FIGS. 7 and 8 or 10 operates in the same way as described in conjunction with the previous embodiments. It should also be noted that, as in the embodiment of FIGS. 11 to 14, the port 33 can be a hole provided in the surface where it is located.

Figure 9:
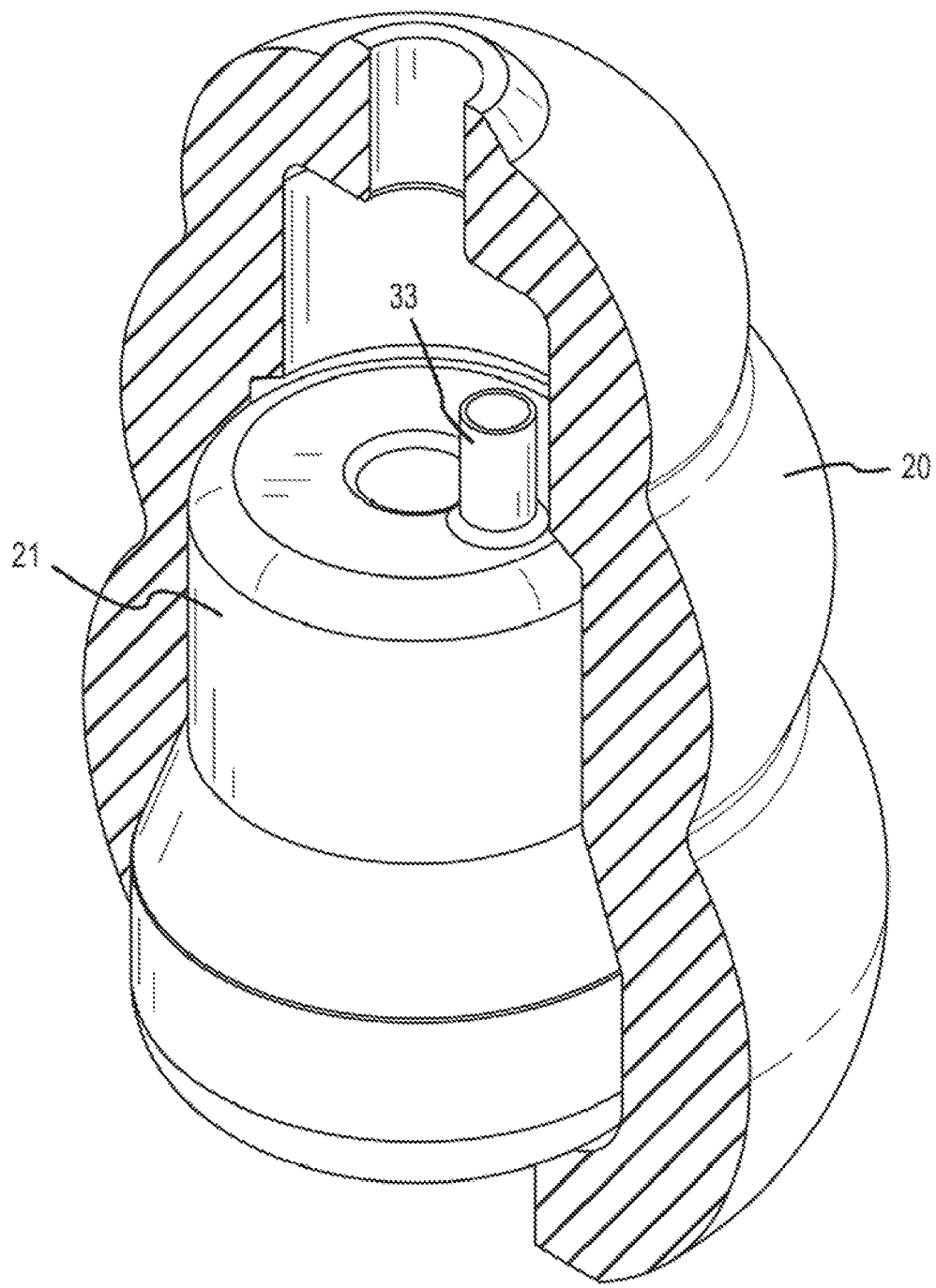
FIG. 9 shows another exemplary configuration of the inventive animal toy.
Figure 10:
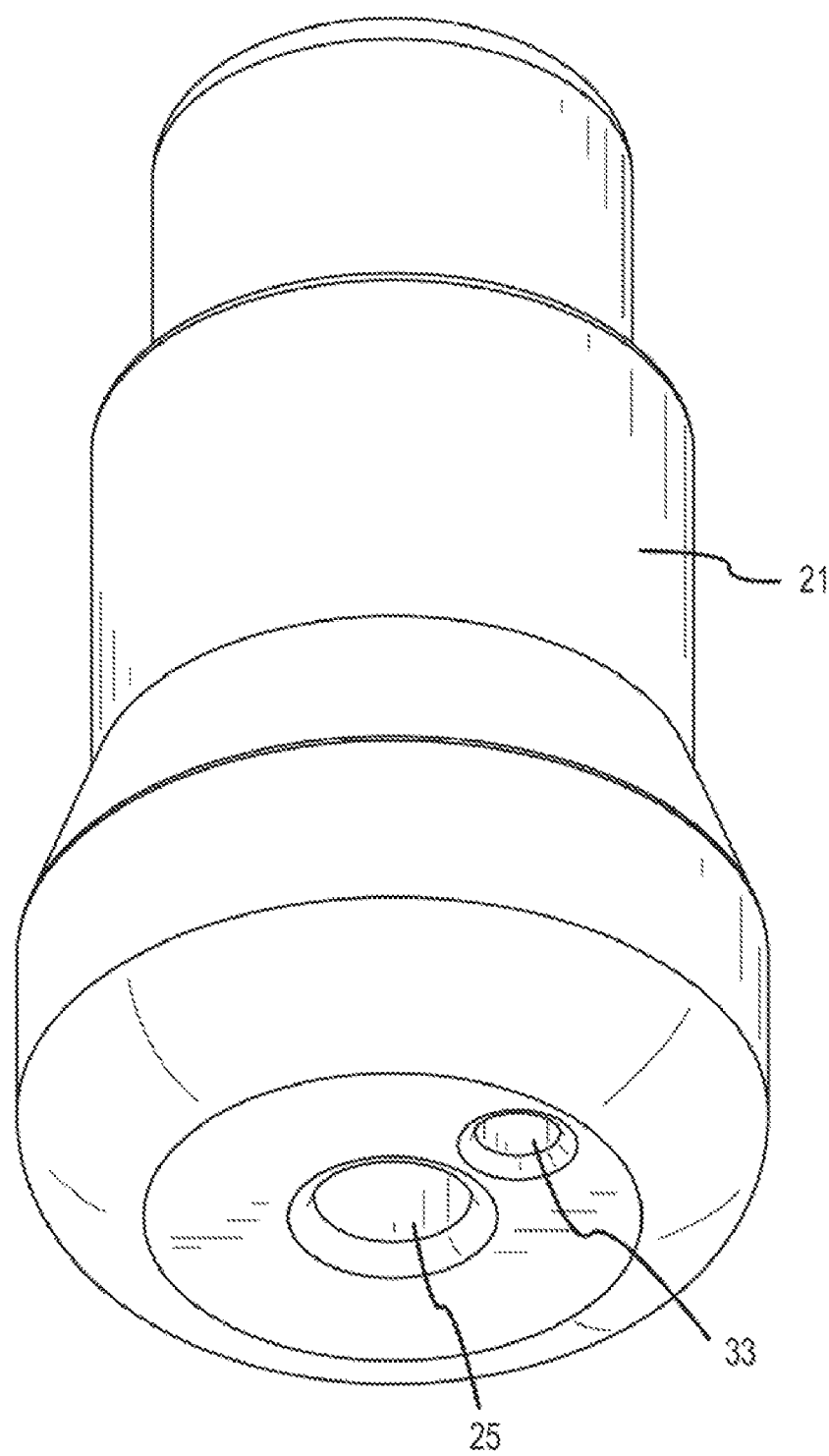
FIG. 10 shows another exemplary embodiment of a hollow insert.

FIG. 9 shows another exemplary embodiment of the toy of the present application. In this embodiment, with the exception of the end where the port 33 is located, the contour of the hollow insert 21 conforms closely to the inner contour of the outer shell member 20.

Although in several of the previously described embodiments the hollow, flexible insert 21 is provided with a central portion or core 25 in order to permit fluid communication between opposite ends of the insert, in a presently preferred embodiment the hollow insert 21 is provided with a recessed portion 48, especially a groove or notch in a peripheral or a mantle surface of the insert 21, as illustrated in FIGS. 11 to 14. This recessed portion 48 also permits fluid communication from one end 26 of the insert 21 to the other end 27 thereof, yet not to the interior of the hollow insert. Furthermore, instead of fluid communication to the interior of the hollow insert 21 being provided by a port 33 disposed in one of the ends of the hollow insert, with the embodiment illustrated in FIGS. 11 and 12 the port 33) which is shown as a hole, is preferably disposed in the base 49 of the recessed portion or groove 48. As in the previously described embodiments, the hole or port 33 also accommodates an acoustic cartridge 35, such as the acoustic cartridge shown in FIGS. 4 and 5. A toy incorporating the hollow insert 21 of FIGS. 11 and 12 operates in the same way as described in conjunction with the previous embodiments. Again, the outer shell member 20 and the hollow insert 21 are not limited to the shapes illustrated in FIGS. 11 and 12.

Figure 11:
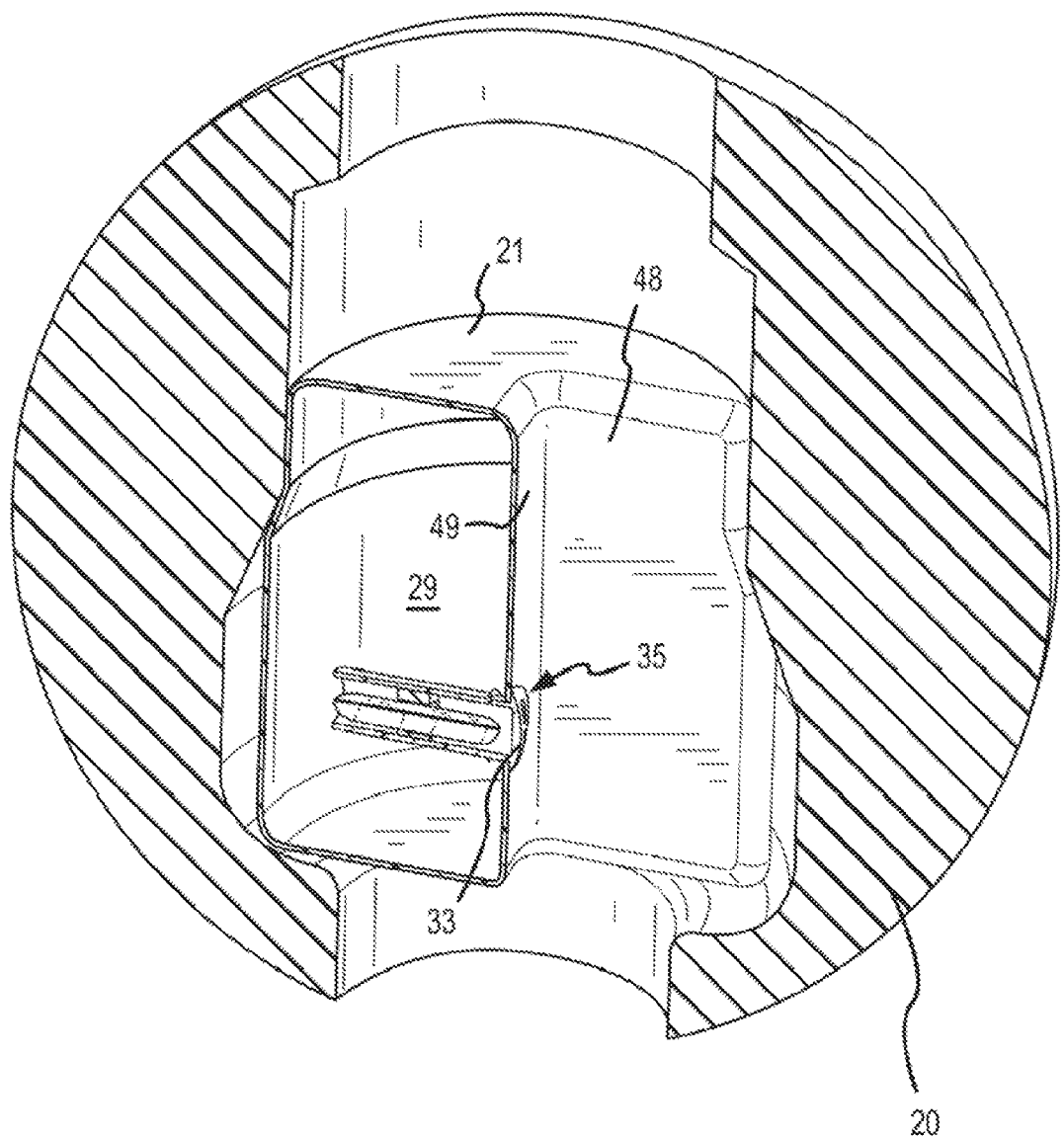
FIG. 11 is a cross-sectional view of an outer shell member encasing another exemplary embodiment of a hollow insert having an acoustic cartridge inserted in the port thereof.
Figure 12:
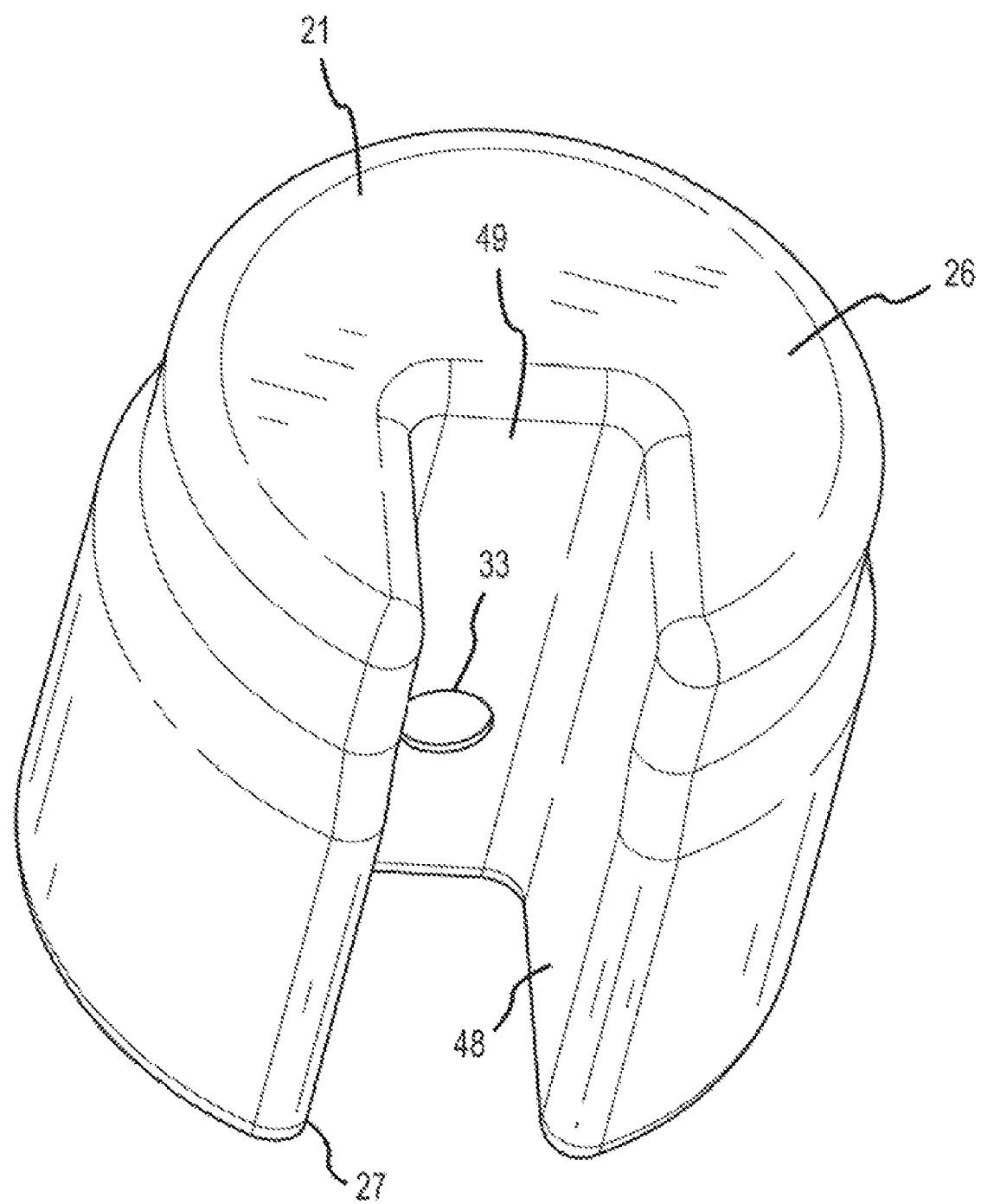
FIG. 12 shows the hollow insert of FIG. 11.

It should be understood that although in the embodiment illustrated in FIGS. 11 and 12 the port 33 is shown as a hole in the base 49 of the recessed portion or groove 48, the port 33 could also have other configurations, such as the outwardly or inwardly extending nipples of the previously described embodiments.

Figure 13:
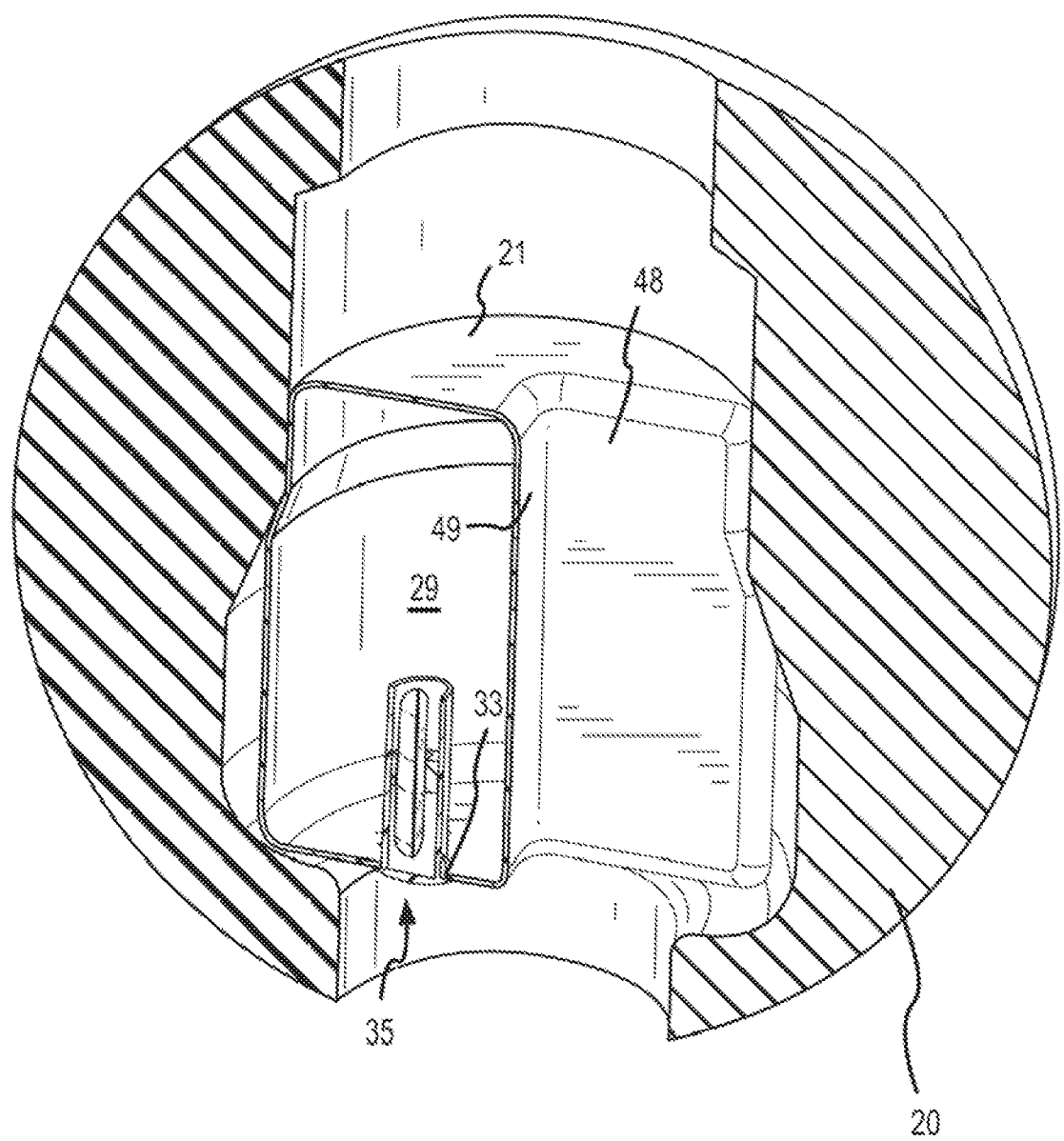
FIG. 13 is a cross-sectional view of an outer shell member encasing a further exemplary embodiment of a hollow insert having an acoustic cartridge inserted in the port thereof.
Figure 14:
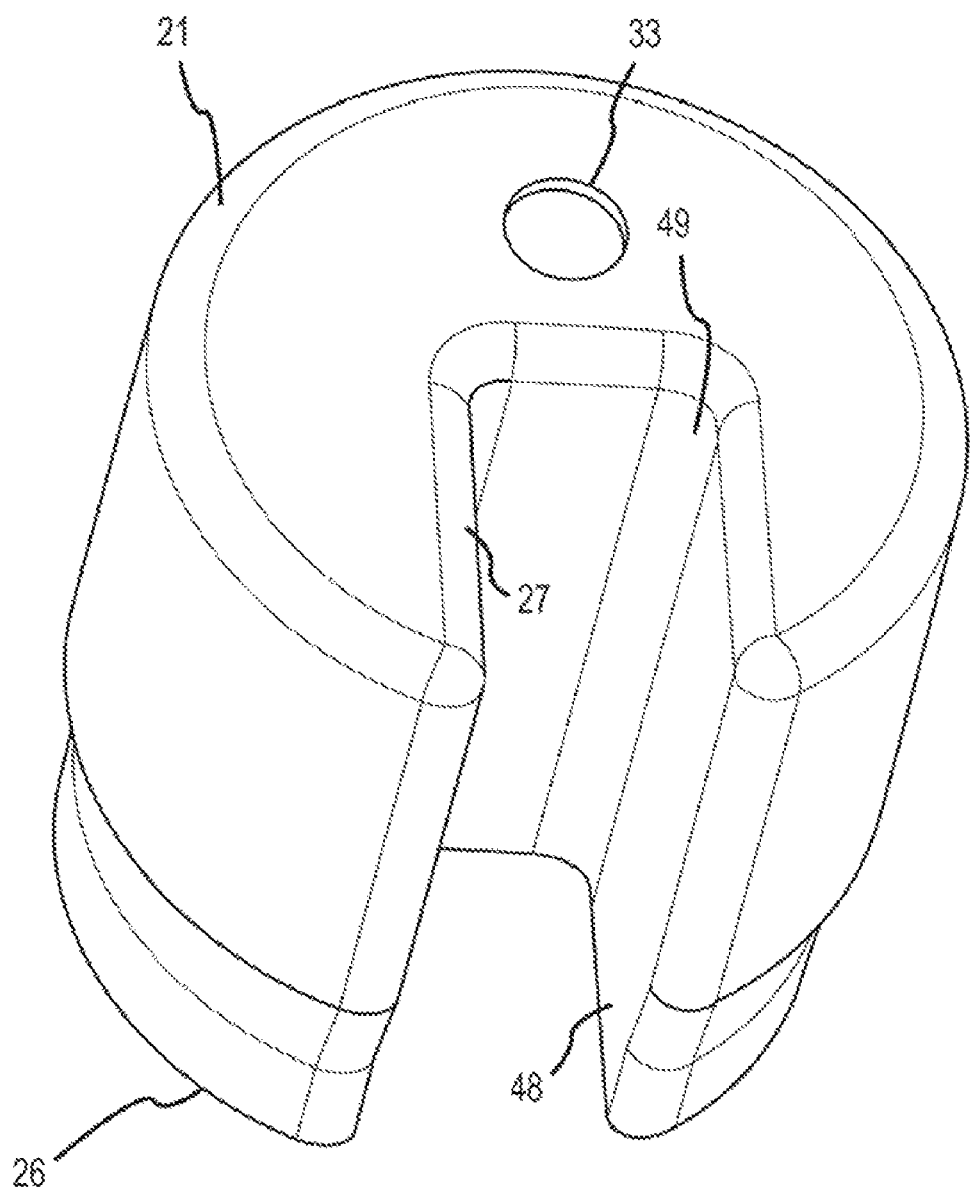
FIG. 14 shows the hollow insert of FIG. 13.

Furthermore, instead of being disposed in the base 49 of the recessed portion or groove 48, the port 33 could be disposed in a side of the groove 48 or could also be disposed at an end or in the mantle surface of the hollow insert 21, as shown in the embodiment illustrated in FIGS. 13 and 14. It should again be pointed out that also with the embodiments illustrated in FIGS. 11-14, the shell member 20 and the hollow insert 21 can have any desired shape. In particular the contour of the hollow insert can conform more closely to the inner contour of the outer shell member, as in the embodiment illustrated in FIG. 9.

As mentioned above, the outer shell member 20 is made of elastomeric material. In particular, in order to withstand the rough play from an animal, the shell member 20 is made of a strong, tough elastomeric material, such as natural rubber or a thermoset rubber, for example SBR rubber having a Shore A hardness of 25-85.

To insert the hollow insert 21 into the shell member 20, the shell member can be stretched by up to 300%, whereupon the hollow insert 21, with or without the acoustic cartridge 35 already inserted into the port 33 of the insert, can easily be inserted through one of the holes 30 or 31 of the shell member 20 into the interior thereof. Depending upon the material of the hollow insert or bladder 21, the latter could also be inserted through one of the holes of the shell member 20 into the interior thereof in a partially collapsed state. The memory of the hollow insert 21 then allows it to assume its original shape. In this case, the acoustic cartridge 35 is inserted into the port 33 prior to placing the insert 21 into the shell member 20.

In order to be able to compress or deform the hollow insert 21 to some extent for activating the acoustic cartridge 35, the hollow insert should be flexible, and is preferably made of a semi-hard material such as LDPE (low density polyethylene), latex, polyurethane, HDPE (high density polyethylene) or ABS resin. At any rate, the outer shell member 20 should be more rigid than is the hollow insert 21.

The present invention is, of course, in no way restricted to the specific disclosure of the specification and drawings, but also encompasses any modifications within the scope of the appended claims.

What I claim is:

1. A toy for animals, comprising:
    an outer, hollow shell member of elastomeric material, wherein said shell member has at least one hole that is open between the hollow interior and the exterior of said shell member;
    a single hollow, flexible insert disposed within said shell member and constantly in at least partial contact therewith, wherein said hollow insert has two oppositely disposed and generally flat ends, further wherein said single hollow insert has a generally cylindrical configuration with a curved outer surface between said two generally flat ends, further wherein said curved outer surface of said hollow insert is provided with a recessed portion in the form of a groove or notch that extends linearly from one of said flat ends to the opposite flat end of said hollow insert, further wherein said recessed portion extends radially inwardly from said curved outer surface of said insert and has two side walls extending inwardly from said curved outer surface, and also has a base that connects said side walls remote from said curved outer surface, further wherein said recessed portion is open to the hollow interior of said shell member but is closed to an interior of said hollow insert, and wherein said hollow insert has a port disposed in said base or one of said side walls of said recessed portion, or in one of said generally flat ends of said hollow insert; and
    an acoustic cartridge disposed in said port of said hollow insert.

2. A toy according to claim 1, wherein said port is a hole in the base of said groove.

3. A toy according to claim 1, wherein said hollow insert is in the form of a bladder.

4. A toy according to claim 1, wherein said port is in the form of a nipple that is monolithic with said hollow insert and extends outwardly therefrom or inwardly into an interior thereof.

5. A toy according to claim 1, wherein said hollow insert is contoured at least partially in conformance to an inner contour of said shell member.

6. A toy according to claim 1, wherein said acoustic cartridge is a squeaker cartridge.

7. A toy according to claim 6, wherein said squeaker cartridge includes an acoustic chamber member.

8. A toy according to claim 7, wherein said acoustic chamber member includes an element covered by a membrane.

9. A toy according to claim 1, wherein said shell member is more rigid than is said hollow insert.

10. A toy according to claim 9, wherein said shell member is made of a natural rubber or a thermoset rubber and has a Shore A hardness of 25-85, and wherein said hollow insert is made of LDPE, latex, polyurethane, HDPE or ABS resin.

11. A toy according to claim 1, wherein spacers are disposed on at least one of said shell member and said hollow insert and are disposed between them.

12. A toy according to claim 1, wherein said hollow insert is in contact with at least 5% of an inner surface of said shell member.

13. A toy according to claim 12, wherein said hollow insert is in contact with at least 40% of an inner surface of said shell member.

14. A toy according to claim 1, wherein said shell member is provided with two holes that are disposed diametrically across from one another.

* * * * *